Sept. 18, 1962  C. A. FREUCHTEL  3,054,558
OIL MILEAGE INDICATOR WITH AUTOMATIC RESET APPARATUS
Filed Sept. 2, 1960  2 Sheets-Sheet 1
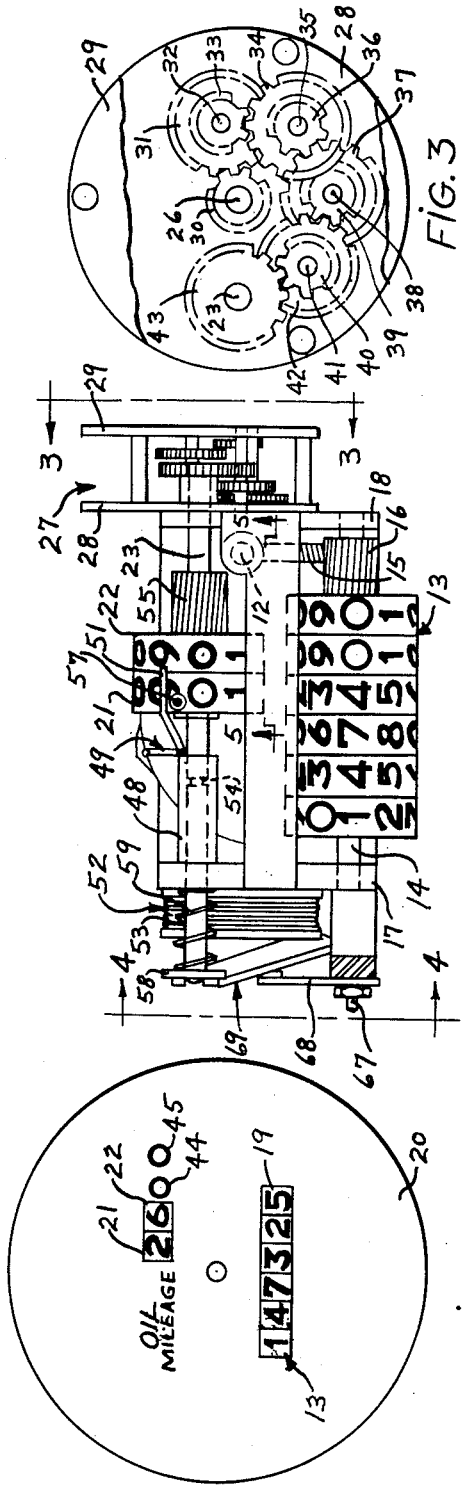
INVENTOR.
CHARLES A. FREUCHTEL
BY
Donnelly, Mentag & Harrington
ATTORNEYS Sept. 18, 1962 C. A. FREUCHTEL 3,054,558
OIL MILEAGE INDICATOR WITH AUTOMATIC RESET APPARATUS
Filed Sept. 2, 1960 2 Sheets-Sheet 2

INVENTOR.
CHARLES A. FREUCHTEL
BY
Donnelly, Mentag & Harrington
ATTORNEYS

United States Patent Office 3,054,558
Patented Sept. 18, 1962

3,054,558
OIL MILEAGE INDICATOR WITH AUTOMATIC RESET APPARATUS
Charles A. Freuchtel, 9971 Hartel Court, Livonia, Mich.
Filed Sept. 2, 1960, Ser. No. 53,682
5 Claims. (Cl. 235—95)

This invention relates generally to a new signaling device for an automotive vehicle, and more particularly to a signaling device incorporated in a counting or measuring mechanism, such as an odometer, for indicating to the operator by a visual signal that the vehicle has traveled a predetermined number of miles since the previous crankcase oil change.

Many signaling devices have been developed in the past which were adapted to indicate visually to the operator of the vehicle when the vehicle had traveled a certain number of miles since the previous crankcase oil change. However, all of the prior art devices of this type require a manual resetting of the device after a crankcase oil change, and this is a disadvantage due to the possibility of the operator overlooking the resetting operation after the oil change. Accordingly, it is an important object of the present invention to provide a signaling device which is incorporated in an odometer and which will indicate a predetermined number of miles since the previous oil change, and which eliminates the need for manual resetting thereof after the crankcase oil change because of the embodying of an automatic reset apparatus therein.

It is another object of the present invention to provide a signaling device of the above mentioned character which may be readily incorporated in the present type vehicle odometers whereby it may be driven by the automotive vehicle speedometer cable.

It is a further object of the present invention to provide a signaling device of the class described which includes an electrically operated reset apparatus which is actuated by means of a float switch mechanism adapted to be automatically operated when the crankcase oil is drained from the crankcase of a vehicle.

It is still another object of the present invention to provide a signaling device of the class described which may be installed in the present day automotive vehicles without extensive modification thereof, and which is simple and compact in construction, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a front elevational view of a speedometer with the numerals and the pointer indicating the speed omitted, but showing both a totalizing odometer and an oil mileage indicating odometer;

FIG. 2 is an enlarged front elevational view of a speedometer apparatus illustrated in FIG. 1, with the face of the device removed;

FIG. 3 is an enlarged right side elevational view of a portion of the structure illustrated in FIG. 2, taken along the line 3—3 thereof and showing the gear reduction drive means embodied in the invention;

FIG. 4 is a left side elevational view of the structure illustrated in FIG. 2, taken along the line 4—4 thereof and looking in the direction of the arrows;

FIG. 5 is a fragmentary, enlarged horizontal view of the structure illustrated in FIG. 2, taken along the line 5—5 thereof and looking in the direction of the arrows;

Figure 7:
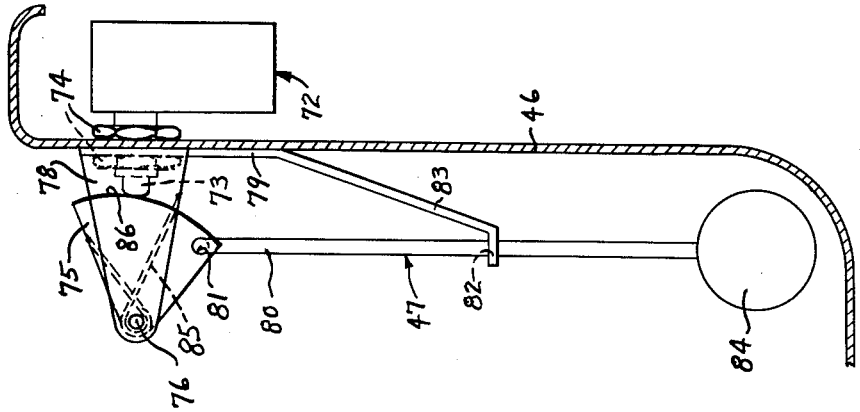
FIG. 7 is an enlarged, fragmentary elevational sectional view of the structure illustrated in FIG. 6, taken along the line 7—7 thereof and looking in the direction of the arrows; and, FIG. 8 is a schematic view of the electrical reset circuit means.

Referring now to the drawings, the numeral 10 indicates the usual speedometer cable, one end of which is attached in the usual way to an automotive vehicle drive shaft and the other end of which is attached to the drive shaft 12 in the conventional speedometer generally indicated by the numeral 11. The speedometer 11 is provided with the usual mileage odometer 13 which comprises a plurality of counting discs mounted in the usual operative manner on the shaft 14. The odometer 13 is adapted to be driven by the gears 15 and 16 which are in turn driven by the shaft 12 by means of an interconnecting worm gear. The odometer shaft 14 is operatively mounted in the housing walls 17 and 18. The disc indicated by the numeral 19 is adapted to indicate tenths of a mile as usual. The speedometer is provided with the usual face plate 20.

The speedometer shown in the drawings is provided with an oil mileage indicator in accordance with the principles of the invention, and it includes the two counter discs 21 and 22 which are operatively mounted on the shaft 23. The counter discs or wheels 21 and 22 are adapted to be moved relative to each other when the shaft 23 is moved by means of the same structure as employed in the totalizing odometer structure 13. That is, the wheel 22 will turn ten revolutions for each revolution of the wheel 21 in accordance with the usual interconnecting odometer drive structure. When the oil mileage indicator wheels 21 and 22 are operated, they are driven by the shaft 12 through the gear reduction means generally indicated by the numeral 27.

As shown in FIGS. 2, 3 and 5, the drive shaft 12 is adapted to drive the gear reducer means input shaft 26 by means of the worm gear 24 which meshes with the gear 25 mounted on the shaft 26. The numerals 28 and 29 indicate the housing walls of the gear reducing means 27. The shaft 26 carries the gear 30 which meshes with and drives the gear 31 which is mounted on the shaft 32. The shaft 32 also carries the gear 33 which drives the gear 34. The gear 34 is mounted on the shaft 35 which also carries the gear 36 which drives the gear 37. The gear 37 is mounted on the shaft 38 which also carries the gear 39 which drives the gear 42. The gear 42 is mounted on the shaft 41 which also carries the gear 40 that drives the gear 43. The gear 43 is mounted on the shaft 23 whereby when the drive shaft 12 is rotated, the oil mileage indicator shaft 23 will be rotated in a one thousand to one ratio. As shown in FIG. 1, the speedometer face 20 would be provided with the two zeros 44 and 45 adjacent the indicator wheels 21 and 22 to produce an oil mileage reading of thousands.

Figure 6:
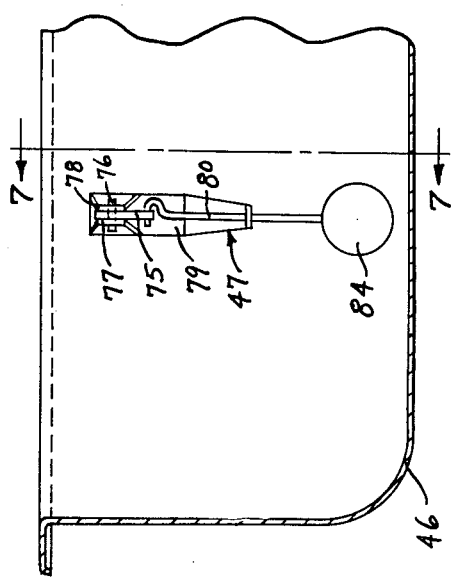
FIG. 6 is a fragmentary elevational view of the inside of an automotive vehicle crankcase, showing the float switch embodied in the invention.

When the oil mileage indicator wheels 21 and 22 reach a predetermined number of miles, such as 2600 as shown in FIG. 1, the operator knows it is time to have his crankcase oil changed. The device of the present invention is so constructed that the indicator wheels 21 and 22 will be automatically reset to the zero position as shown in FIG. 2 when the crankcase oil is drained from the crankcase 46. As shown in FIGS. 6 and 7, a reset switch means, generally indicated by the numeral 47, is mounted inside of the crankcase 46 and this switch is operated when the crankcase 46 is drained. As shown in FIG. 2, the oil mileage indicator shaft 23 is slidably mounted in the sleeve 48 which is seated against the housing wall 17 by the spring 49. The flexible spring wire arm 49 is mounted on the upper side of the speedometer structure and has the rear end thereof fixedly mounted to the part 50 of the speedometer housing. The other end of the retainer spring arm 49 is indicated by the numeral 51 and is bent sidewardly so as to be disposed parallel to and over the face of the counter disc 21.

The reset switch 47 is adapted to energize the solenoid coil 52 by means of an electrical reset control circuit described hereinafter in detail, whereby the shaft 23 on which gear 55 is mounted with a press fit will be moved to the right as viewed in FIGS. 2 and 5 so as to bring the drive gear 55 into operative meshing engagement with the worm 56 on the shaft 12. When the shaft 23 is moved to the right, the retainer spring arm 49 will engage the groove 54 in the shaft 23 so as to hold the gears 55 and 56 in operative engagement. When the shaft 23 is moved to the right in the aforedescribed manner, the gear 43 is disengaged from the drive gear 40 to permit the shaft 12 to directly drive the gear 55 and rotate the counter discs 21 and 22 back to the starting zero position shown in FIG. 2 in a quick manner. The number of miles it would take to return the counter wheels 21 and 22 from the reading shown in FIG. 1 to the zero reading shown in FIG. 2 would depend upon the gear ratios selected for the gears 55 and 56. For example, with one gear ratio it would take a distance of 8 miles to return the wheels 21 and 22 to the starting zero position, as indicated by the difference in readings between the odometers 13 of FIGS. 1 and 2. When the counter wheel 21 is making the last portion of its movement back to the zero starting position, the projection or pin 57 on the wheel 21 will engage the retainer arm 51 and raise the retainer 49 out of the groove 54 whereby the return spring 59 will move the shaft 23 to the left as shown in FIG. 2 to disengage the aforementioned overdrive reset gear drive means and to re-engage the regular drive means through the gear reduction means 27. As shown in FIGS. 2 and 4, the return spring 59 is mounted on the extension 53 of the shaft 23 and is disposed between the outer face of the housing wall 17 and the disc 58 carried on the outer end of the shaft portion 53.

Figure 8:
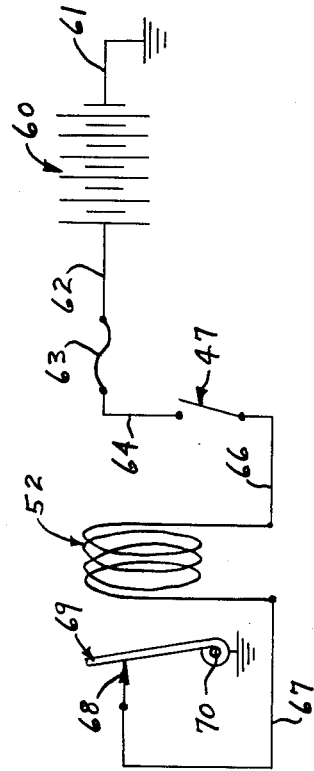

The solenoid 52 is operated in the following described manner. As shown in FIG. 8, the reset circuit means includes the automotive vehicle battery 60 which is connected by the lead 61 to ground. The reset switch 47 is connected to the other side of the battery 60 by means of the leads 62 and 64 and the fuse 63. The reset switch 47 is connected to one side of the coil 52 by means of the lead 66. The other end of the coil 52 is connected by means of the lead 67 to the contact arm 68 which is normally engaged with the solenoid armature 69. The armature arm 69 is pivotally mounted at the point 70 and this arm is in turn grounded. It will be seen that when the reset switch 47 is closed, a circuit will be completed through the coil 52 whereby the armature arm 69 will be pulled to the right as viewed in FIGS. 2 and 8 due to the normal solenoid action, whereby the circuit will be immediately broken. The armature arm 69 is connected at the point 71 to the disc 58 on the shaft portion 53 whereby when the coil 52 is energized, the movement of the armature arm 69 to the right will also move the shaft 23 to the right to permit the counter discs 21 and 22 to be reset in the aforedescribed manner.

The reset switch 47 comprises a conventional microswitch 72 which is provided with the usual operating switch plunger 73. The switch 72 would be mounted on the outside of the crankcase 46 wtih the plunger 73 extended into the crankcase and held in place by means of the lock nut 74. The plunger 73 is operated by means of the arm 75 which is pivoted on the shaft 76 between the arms 77 and 78. The support arms 77 and 78 are fixedly mounted on the bracket 79 which is fixed to the inside surface of the crankcase 46. A rod 80 is hingedly mounted at the front end thereof in the hole 81 in the switch lever or arm 75. The rod 80 carries the fixedly mounted float bulb 84 on the lower end thereof, and this rod is slidably mounted through the hole 82 in the guide arm 83 which is integral with the bracket 79. It will be seen that when the crankcase is drained, the float 84 will drop downwardly with the help of spring 85 so as to pivot the lever 75 to actuate the switch plunger 73 by means of the cam surface 86 and energize the reset circuit of FIG. 8 in the aforedescribed manner.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In an oil mileage indicator, the combination of, a power drive shaft; a set of counter wheels for indicating the mileage of a vehicle travelled since its last oil change; a gear reduction unit interconnecting said drive shaft and said counter wheels for driving the same; said counter wheels being movable for engagement directly with said drive shaft for direct driving engagement therewith for resetting the counter wheels back to a zero reading when the oil is drained; an electrical solenoid connected to said counter wheels for moving the same into direct driving engagement with said drive shaft; a switch means operable when the oil is drained and operative to energize said solenoid; switch operating means engageable with the oil to be changed and being actuated by gravity when the oil is changed to operate said switch means; and, means for returning said counter wheels to normal operating positions when they have been reset to a zero reading.

2. In an oil mileage indicator for indicating the total miles between oil changes travelled by a vehicle, the combination of, a power drive shaft adapted to be driven by the drive shaft of the vehicle; a set of counter wheels for indicating the mileage travelled by the vehicle since its last oil change; means for connecting said drive shaft to said counter wheels to provide a reading on said counter wheels indicative of the miles travelled by the vehicle; said counter wheels being movable for engagement directly with said drive shaft and to disable the means connecting them to the drive shaft for resetting the counter wheels back to a zero reading when the oil is drained from the vehicle crankcase; an electrical solenoid connected to said counter wheels for moving the same into direct driving relationship with said drive shaft; a switch means operable when the oil in the vehicle crankcase is drained for energizing said solenoid to reset said counter wheels; switch operating means engageable with the oil to be changed and being actuated by gravity when the oil is changed to operate said switch means; and, means for returning said counter wheels to normal operating positions when they have been reset to a zero reading.

3. The invention as set forth in claim 2, wherein: said switch operating means comprises, a float member mounted in the crankcase of the vehicle, said switch being connected to said solenoid and mounted in said crankcase, and a cam operated by said float member and operative to engage said switch and operate the same when the crankcase is drained of oil and said float member moves to the bottom of the crankcase.

4. The invention as set forth in claim 2, wherein: said means for connecting said drive shaft to said counter wheels to provide a reading on said counter wheels indicative of the miles travelled by the vehicle includes a gear reduction mechanism.

5. The invention as set forth in claim 2, wherein: said means for returning said counter wheels to normal operating positions after they have been reset includes a return spring, a retainer spring for holding the wheels in the resetting position and a trip means carried on said wheels.

References Cited in the file of this patent

UNITED STATES PATENTS

| | | |
|---|---|---|
| 1,482,596 | Berge | Feb. 5, 1924 |
| 1,945,317 | Kalin | Jan. 30, 1934 |
| 2,052,080 | Cale | Aug. 25, 1936 |